(12) United States Patent
Busch et al.

(10) Patent No.: US 11,338,495 B2
(45) Date of Patent: May 24, 2022

(54) DEVICE AND METHOD FOR CONTROLLING THE THROUGHFLOW OF BLOW-MOLDING FLUID DURING THE BLOW MOLDING OF CONTAINERS

(71) Applicant: Aventics GmbH, Laatzen (DE)

(72) Inventors: Christian Busch, Hannover (DE); Heinz-Herrmann Meyer, Seelze (DE); Theo Paulus, Xanten (DE); Francis Petitjean, Bonneville (FR)

(73) Assignee: Aventics GmbH, Laatzen (DE)

(*) Notice: Subject to any disclaimer, the term of this patent is extended or adjusted under 35 U.S.C. 154(b) by 47 days.

(21) Appl. No.: 16/461,674

(22) PCT Filed: Nov. 6, 2017

(86) PCT No.: PCT/DE2017/000366
§ 371 (c)(1),
(2) Date: May 16, 2019

(87) PCT Pub. No.: WO2018/091006
PCT Pub. Date: May 24, 2018

(65) Prior Publication Data
US 2019/0351603 A1 Nov. 21, 2019

(30) Foreign Application Priority Data
Nov. 16, 2016 (DE) ...................... 10 2016 013 635.9

(51) Int. Cl.
*B29C 49/78* (2006.01)
*B29C 49/08* (2006.01)
(Continued)

(52) U.S. Cl.
CPC ............ *B29C 49/783* (2013.01); *B29C 49/08* (2013.01); *B29C 49/4289* (2013.01);
(Continued)

(58) Field of Classification Search
CPC ... B29C 49/783; B29C 49/08; B29C 49/4289; B29C 2949/78025; B29C 2949/78378;
(Continued)

(56) References Cited

U.S. PATENT DOCUMENTS

2006/0097417 A1* 5/2006 Emmer ............... B29C 49/6445
264/40.1
2006/0197263 A1* 9/2006 Crider .................... B29C 49/18
264/529
(Continued)

FOREIGN PATENT DOCUMENTS

DE 198 43 053 A1 3/2000
DE 102 40 252 A1 3/2004
(Continued)

OTHER PUBLICATIONS

International Search Report corresponding to PCT Application No. PCT/DE2017/000366, dated Feb. 7, 2018 (German and English language document) (7 pages).

*Primary Examiner* — Thomas C Lee
*Assistant Examiner* — Michael Tang
(74) *Attorney, Agent, or Firm* — Maginot, Moore & Beck (57) ABSTRACT

The disclosure relates to a device and a method for controlling the throughflow of blow-molding fluid during the blow molding of containers. It is the intention to provide a control device and a control method which permit a controlled or defined growth and a defined propagation of the container bubble formed by the expanding preform in the pre-blowing phase of the blow molding process without the specification of a specific setpoint value profile or of a setpoint value curve. The object is achieved by means of a control device and a control method having a proportional valve with a variable throughflow cross section, having an actuator for the operation of the proportional valve, having a means for detecting the position of the actuator, and having sensor (Continued)

means for detecting the valve inlet and valve outlet pressure, wherein a time for the attainment of the yield point for the preform, a container volume and a time period for the attainment of the container volume are predefinable, and, by means of a digital controller, during the pre-blowing phase, from the attainment of the yield point until the run duration, a calculation of control values for the operation of the actuator in order to attain the predefined container volume within the predefined time period is performed in automated cyclic fashion, and the actuator is operated in accordance with the calculated control values, wherein, in each calculation cycle, the calculation of the respectively next control value is performed taking into consideration the container volume attained prior to the respective calculation cycle and calculated on the basis of the previous actuator positions and the previous pressure profile.

13 Claims, 4 Drawing Sheets (51) Int. Cl.
  *B29C 49/42*    (2006.01)
  *G05B 19/416*    (2006.01)
  *B29L 31/00*    (2006.01)
(52) U.S. Cl.
  CPC .. *G05B 19/416* (2013.01); *B29C 2949/78025* (2013.01); *B29C 2949/7889* (2013.01); *B29C 2949/78378* (2013.01); *B29C 2949/78537* (2013.01); *B29L 2031/712* (2013.01); *G05B 2219/37371* (2013.01)
(58) Field of Classification Search
  CPC .. B29C 2949/78537; B29C 2949/7889; B29C 49/78; B29C 49/06; B29C 49/12; G05B 19/416; G05B 2219/37371; B29L 2031/712; B29L 2031/7158
  See application file for complete search history.

(56) References Cited

U.S. PATENT DOCUMENTS

| | | | |
|---|---|---|---|
| 2006/0212161 A1* | 9/2006 | Bhat | B29C 49/78 700/197 |
| 2009/0171476 A1* | 7/2009 | Aloni | G05B 19/41875 700/7 |
| 2010/0201013 A1* | 8/2010 | Monin | B29C 49/783 264/40.3 |
| 2013/0161877 A1* | 6/2013 | Lisch | B29C 49/46 264/521 |
| 2014/0097367 A1* | 4/2014 | Burt | F24D 19/1015 251/129.04 |
| 2015/0013387 A1* | 1/2015 | Borcherding | C03B 9/406 65/29.11 |
| 2015/0042021 A1* | 2/2015 | Schmid | B29C 49/783 264/526 |
| 2016/0023396 A1* | 1/2016 | Litzenberg | B29C 49/18 264/40.3 |
| 2016/0114519 A1* | 4/2016 | Dachs | B29C 49/4205 264/547 |
| 2016/0136868 A1* | 5/2016 | Haller | B29C 49/78 264/37.16 |
| 2016/0245423 A1* | 8/2016 | Hahn | B29C 49/4289 |
| 2019/0061223 A1* | 2/2019 | Lhomme | B29C 49/06 |

FOREIGN PATENT DOCUMENTS

| | | |
|---|---|---|
| DE | 20 2004 018 237 U1 | 3/2005 |
| DE | 10 2006 061 301 A1 | 6/2008 |
| DE | 10 2008 013 419 A1 | 9/2009 |
| EP | 2 097 242 B1 | 2/2011 |
| EP | 2 094 467 B1 | 8/2011 |
| EP | 2 101 984 B1 | 2/2014 |
| EP | 3 015 248 A1 | 5/2016 |

\* cited by examiner

DEVICE AND METHOD FOR CONTROLLING THE THROUGHFLOW OF BLOW-MOLDING FLUID DURING THE BLOW MOLDING OF CONTAINERS

This application is a 35 U.S.C. § 371 National Stage Application of PCT/DE2017/000366, filed on Nov. 6, 2017, which claims the benefit of priority to Serial No. DE 10 2016 013 638.9, filed on Nov. 16, 2016 in Germany, the disclosures of which are incorporated herein by reference in their entirety.

The disclosure relates to a device and to a method for controlling the throughflow of blow-molding fluid during the blow molding of containers.

BACKGROUND

The prior art discloses the production of hollow bodies produced from thermoplastic materials by means of a blow-molding fluid (blow-molding air, a blow-molding gas or even a liquid) as blow molding or plastic blow molding. In this case, a thermally preconditioned (heated) preform (also designated in the prior art as a parison) is molded in the flowable state as a result of introducing the blow-molding medium (the blow-molding fluid) at a defined blow-molding pressure to the inside contours of a blow-molding tool (the blow-molding mold). Packaging articles such as bottles, canisters or vessels can be produced in this way. In the case of stretch blow molding, the hollow body is stretched simultaneously in the circumferential and longitudinal direction above its glass transition temperature or crystalline melting temperature. In this connection, improved mechanical characteristics (greater strength with thinner wall thickness, permeation reduction, stronger surface sheen) are achieved on account of the simultaneous biaxial reorientation of the macromolecules of the plastics material. In the case of this method, the heated preform is stretched mechanically by means of a stamp or a horizontal bar simultaneously with the circumferential stretching by means of the blow-molding fluid. The introduction of the blow-molding fluid into the heated preform is effected during the blow molding or stretch blow molding process as a rule in two phases, a pre-blow molding phase at a lower pressure level within the range of approximately between 5 and 10 bar and a final blow molding phase (main blow molding phase) at a higher pressure level within the range of approximately between 25 and 40 bar. The pre-blow molding phase serves for expanding the preform in as uniform a manner as possible inside the blow molding mold and the molding thereof along the inside contours of the blow molding mold. The definitive pressure shaping of the container (also designated as the "blowing out") is effected in the final blow molding phase where the expanded preform is pressed against the walls of the blow molding mold and receives its definitive contours. In the case of stretch blow molding, the longitudinal stretching as a result of the stamp or horizontal bar being extended in a linear manner and the circumferential stretching as a result of the blow-molding fluid is effected simultaneously during the pre-blow molding phase. The practical requirement for container forms that are more and more complex spatially with a production process that is at the same time as energy-saving and material-efficient as possible requires the introduction of the blow-molding fluid into the preform to be controlled or regulated in as precise a manner as possible as early as in the pre-blow molding phase of the blow molding process. A defined growth in the container balloon and a material distribution which is as uniform or defined as possible in the expanded preform and can essentially no longer be corrected in the main or final blow molding phase are to be achieved during the pre-blow molding phase. The expanding container balloon is either to maintain a distance from the inside contours of the blow molding tool (the blow molding mold) that is as constant and tight as possible without already touching the tool wall or else is to abut precisely against said tool wall only in defined regions at the end of the pre-blow molding phase.

Different solution approaches and paths have been proposed in the prior art for controlling or regulating the introduction of the blow-molding fluid.

Fundamental realizations of an installation and a method for the stretch blow molding of containers produced from a thermoplastic material are described in the prior art of DE 198 43 053 A1. Furthermore, DE 198 43 053 A1 discloses a parameter control from which at least one parameter that influences the shaping operation is predefined for at least two preforms that are processed consecutively in a manner deviating one from another, by, for example, the pressure course of the pre-blow molding and main blow molding phases for two containers being predefined differently relative to one another. This serves to compensate a temperature distribution in the material of the preforms that is unequal relative to one another. DE 198 43 053 A1 does not disclose any means for controlling or regulating the throughflow of the pressure means during the pre-blow molding phase of a container that is adapted to the special shaping of a container.

DE 20 2004 018 237 U1 discloses a valve arrangement for controlling the compressed air during the blow molding of plastic bottles with a variably adjustable throttle valve which enables the throughflow rates to be predefined in an application-specific variable manner as an open chain of effects.

DE 102 40 252 A1 discloses a method and a device for the stretch blow molding of containers with an optimized process sequence. To this end, a proportional valve and a pressure sensor are arranged in a supply line between a compressed air source and the blow-molding mold, the proportional valve being regulated in a closed sphere of activity (control circuit) by a regulating device by way of a pressure course that is predefined in time and stored as a setpoint value profile in a course memory. The specification of a definable pressure course in the pre-blow molding phase is made possible with the method and the device.

Patent documents EP 2 101 984 B1, EP 2 097 242 B1 and EP 094 467 B1, which together go back to French priority application FR 0610618 A, disclose various realizations of a method and a control unit for the stretch blow molding of containers from a preform produced from plastics material, where an electric valve is controlled during the pre-blow molding phase by way of a predefined course and the pressure course in the preform is continually detected. Characteristic points in the measured pressure course (for example the attainment of a pressure peak) are determined and the attained values (time point of the pressure peak, achieved pressure value) are compared with predefined theoretical values of a theoretical course curve. If the values do not agree with one another and are outside a defined tolerance zone, either a modification of predefined method parameters (for example the pre-blow molding pressure, pre-blow molding throughput, the speed of the horizontal bar or pre-heat temperature of the preform) or a time displacement of the predefined method sequence (modification of the pre-blow molding synchronization point, of the pre-blow molding start or the pre-blow molding tripping time) is effected for the control procedure from one of the next method passes for the container production.

DE 10 2006 061 301 A1 discloses a method for the blow molding of containers produced from plastics material, where pressurized blow-molding air is introduced into a preform via a proportional valve in dependence on a pre-determined sequence of the blow molding operation, the proportional valve being actuated in an open chain of effects according to a predefined course of the mass flux and its throughflow cross section being modified. As an alternative to this or in addition to it, the proportional valve can be regulated in a closed loop by the actual mass flux being determined, for example, by means of a flow meter.

DE 10 2008 013 419 A1 discloses a method and a device for the blow molding of containers from a preform produced from thermoplastic material, where during the shaping of the preform into the container at least one parameter characterizing the shaping is measured and evaluated by a control device and, in dependence on said evaluation of the development of the container balloon, at least one manipulatable variable influencing the shaping operation is modified inside a closed control loop for adapting the measured parameter to an associated setpoint value.

Common to the devices and methods disclosed in the prior art is that control or regulation of the throughflow of the blow-molding air is effected in an open chain of effects or a closed loop by way of a reference variable that is predefined as a course and is modifiable in time (setpoint value course over time). This requires in each case the prior creation of a setpoint value profile or a setpoint value curve for the development of the predefined value beyond the chronological sequence of the blow molding operation or at least of the pre-blow molding phase. Such a setpoint value profile or such a setpoint value curve must first of all be tested and defined separately for each material mixture and container shape and each machine type in time-consuming pre-trials. This is effected in practice by "trial and error", which can be a very time-consuming process according to the course of the pre-trials. In addition, the predefinition of a fixed setpoint value profile or setpoint value curve harbors the further disadvantage that disturbance variables not detected by the respective setpoint value profile (for example modified material characteristics and dimensional tolerances of the preform, effects of wear on the component parts involved, processing temperatures inside the container shape oscillating on account of external influences) can only be considered insufficiently as a result of the rigid default of a value course.

SUMMARY

The object underlying the disclosure is to create an improved control device and an improved control method for the blow molding of containers which avoid the disadvantages shown. In particular, a control device and a control method for the blow molding of containers are to be created which enable a controlled or defined growth and a defined expansion of the container balloon formed by the expanded preform in the pre-blow molding phase of the blow molding process without predefining a specific setpoint value profile or a setpoint value curve.

The object is achieved according to the disclosure by a control device as claimed in claim 1 and a control method as claimed in claim 9. Advantageous further developments of the disclosure are provided in the subclaims.

The core of the disclosure is formed by a device for controlling the throughflow of blow-molding fluid during the blow molding of containers produced from preforms (also designated below in summary as a "control device"), which device includes a proportional valve having a modifiable throughflow cross section, an actuator for actuating the proportional valve, a means for detecting the position of the actuator, sensor means for detecting the valve inlet pressure and valve outlet pressure and a digital control device and where the digital control device is set up in a programming manner for the purpose of calculating cyclically, in a manner automated to the run-time, control values for actuating the actuator for the attainment of a predefined container volume within a predefined time period during the pre-blow molding phase from the attainment of a predefinable time point, which corresponds to the attainment of the yield point of the preform, wherein in each calculation cycle the calculation of the respectively next control value is effected with consideration to the container volume attained up to the respective calculation cycle and calculatable by way of the previous actuator positions and the previous pressure course.

The term of blow molding is used as a generic term for blow molding or stretch blow molding in the sense of the disclosure, the device according to the disclosure and the method according to the disclosure can be used to control both method forms.

The disclosure has recognized that a defined growth in the container is attained in the pre-mold blowing phase of a blow molding process simply b the required throughflow of the blow-molding fluid of a proportional valve being calculated cyclically in manner automated to the run-time by way of the predefinition of the desired container volume and of the time period to attain said volume as a sequence of control values for the actuating of the proportional valve, the container volume already attained up to the respective calculation cycle and calculatable by way of the detected previous actuator positions and the detected previous pressure course being taken into consideration in each case. As a result, it is possible to dispense with the time-consuming testing and defining of a setpoint value profile or a setpoint value curve with discrete values over time for the actuation of the proportional valve. The parameterization of the respective blow-molding station is simplified in a considerable manner. To this end, the control device according to the disclosure starts at the time of the attainment of the yield point of the preform, from which the expansion of the preform and consequently the stretching of the container balloon inside the blow mold begins. This can be determined in pretrial, where necessary, in a considerably simpler manner than a complete setpoint value profile or a setpoint value curve for the necessary specification of the time-related development of a control or regulating parameter (blow-molding pressure, throughflow of the blow-molding fluid or mass flux of the blow-molding fluid) over the entire time-related course of the pre-blow molding phase. The precise time of the attainment of the yield point during blow molding is a material-specific characteristic and designates the attainment of the state of stress from which the material of the preform starts to flow without the stress applied being increased further. From the point where the yield point is exceeded, sudden plastic deformation is seen as expansion of the preform. In this connection, on account of the container starting to grow, a sudden pressure drop starts on the working side of the system and consequently at the outlet of the proportional valve. The effect of exceeding the yield point during the blow molding of preforms produced from plastics material is described in the prior art by patent documents EP 2 101 984 B1, EP 2 097 242 B1 and EP 2 094

467 B1 which go back to the common French priority application FR. 0610618 A as well as patent document U.S. Pat. No. 8,721,940 B2, which belongs to said patent family, the yield point in U.S. Pat. No. 8,721,940 B2 being designated as the "plastic flow threshold" and the time of the exceeding of the yield point as the "development, moment $t_B$". From said time, which is predefined according to the disclosure, the control behavior of the device according, to the disclosure begins by control values for the future actuation of the actuator for the attainment of the predefined container volume within a predefined time period being calculated cyclically in a manner automated to the run-time by means of the control device which is set up correspondingly in a programmed manner, wherein in each calculation cycle the calculation of the respectively next control value is effected with consideration to the container volume attained up to the respective calculation cycle (previous sequences of the valve inlet and valve outlet pressure). To this end, the program-related setup of the control device includes instructions by way of which is imaged a corresponding suitable technical control model, which is formed according to the general laws of fluid mechanics with the known relationships between the variables volume flow and mass flow, according to which the calculation of the respectively next control value for the actuation of the actuator for the attainment of the predefined container volume within the time period predefined for this purpose is effected in an automated cyclical manner as a control value sequence with consideration to the container volume already attained up to now. The device according to the disclosure has the advantage that a controlled growth and a defined expansion of the container balloon is attained in the pre-blow molding phase of the blow molding process without the specification of a setpoint value profile or a setpoint value curve being necessary for a regulating parameter, such as, for example, the blow molding pressure, the throughflow of the blow-molding fluid or the mass flux of the blow-molding fluid, over the time course of the pre-blow molding phase. The growth in the container is defined solely by the predefined container volume which is to be attained inside a time period which is also predefined. In this connection, continuing self-correction is intrinsic to the device according to the disclosure by the calculatable container volume that has already been attained in each case being taken into consideration in each calculation cycle. The influence of disturbance variables that are not directly detectable, such as, for example, deviations in the material characteristics of the preform, changes caused by the effects of wear on the component parts involved, or external influences, such as, for instance, oscillating processing temperatures inside the container shape or the thermal pre-conditioning of the preform, are compensated obliquely or indirectly by the cyclical recalculation of the respectively next control value in each case with consideration to the container volume already attained up to the time of calculation. The container volume, calculatable in each case and already attained so far, includes, in this connection, a practical correction point by way of which relevant modifications in the system, brought about by disturbance variables, are indirectly detected and are taken into consideration successively during the calculation of the control values as a result of consideration of the actual previous pressure course detected by the sensor means (development of the difference between valve inlet and valve outlet pressure). As, according to the disclosure, each proportional valve is realized with its own control device, individual blow molding stations inside the same blow molding installation are able to be operated independently of one another as each control device is parameterizable independently and differently to one another. This enables the simultaneous production of container forms which differ from one another and/or the processing of different material mixtures at the individual blow-molding stations of a blow molding installation.

The point in time which corresponds to the attainment of the yield point of the preform is predefinable in a simple manner as a specific pressure value. Up to attaining the yield point, a continuous increase in pressure is brought about in the preform as a result of the introduction of the blow-molding fluid. As soon as the yield point is exceeded, the preform begins to expand, which is linked to an instant drop in pressure on the operating side of the proportional valve which communicates with the blow mold and the container balloon expanding therein. Directly prior to the attainment of the yield point, a maximum pressure value is consequently attained which is detectable by way of the sensor means for detecting the valve outlet pressure. By said maximum pressure value, which corresponds to the attainment of the yield point, being predefined, the time of the attainment of the yield point is consequently detectable by the control device and is utilizable as starting time for the calculation of the control values.

The point in time which corresponds to the attainment of the yield point of the preform is predefinable in a self-optimizing realization as a target definition as a certain time or a certain time interval from the start of the pre-blow molding phase or of the introduction of the blow-molding fluid. To convert said target definition, the control device is set up in a programming manner for the purpose of determining the attainment of the yield point as a result of the evaluation of the valve outlet pressure as acquiring a pressure peak and of calculating a control sequence for actuating the actuator for attaining the yield point up to the predefined time point or expiry of the predefined time interval. In this case, the control device already controls the introduction of the blow-molding fluid for said interval of the pre-blow molding phase prior to the attainment of the yield point by way of a corresponding control sequence (actuator position). The calculation of said control sequence to be applied up to the attainment of the yield point requires at least one first device pass (a first pass of the blow molding process at a constant valve lift) in order to determine the specific yield point of the material to be processed in each case as a result of the evaluation of the valve outlet pressure at a selectable constant valve lift (position of the actuator) as acquiring a pressure peak. During regular operation (after the initial setup) the control device in said realization has a further self-optimizing characteristic since deviations in the physical characteristics of the processed preforms—for example their pre-tempering or quality—which result in a time delay of the yield point, are recognized and corrected. Such deviations in quality frequently exist in practice for instance when using biodegradable plastics.

For functional integration into fieldbus or industrial Ethernet systems, system devices and/or a programmable logic plant control system (PLC) existing at the site of the installation, the control device is realized with at least one data communications interface which is compatible with at least one industrial protocol standard. The control device is, for example, parameterizable via the data communications interface (input or modification of the default parameters), in addition sensor data, calculation data or other process data, which is acquired and stored (as buffering) by the control device, can be called up via the data communications interface. Finally, the control device can receive control signals from a programmable logic plant control system (PLC). The precise design of the data communications interface is chosen by way of the desired compatibility and the desired scope of performance. For example, this is a wired fieldbus interface that is compatible with the industry standards Profibus, DeviceNet/ControlNet or CANopen or a wired network interface (industrial Ethernet) that is compatible with the industry standards Profinet, EtherNet/IP, Ethernet Powerlink or EtherCat. Such a data communications interface can be designed to be compatible with several protocol standards (data transmission protocols) at the same time (for example by using an anybus module). Where designed as a wired data communications interface, the control device is also connectable via the same indirectly to an external access point for wireless data communication, for instance an industrial wireless access point. However, the control device can also be realized directly with a corresponding wireless data communications interface, for instance an industrial WLAN interface (IWLAN). As a result of the integration of such an industry-compatible data communications interface, the control device is able to be integrated simply into existing system devices and into an existing higher-level programmable logic plant control system (PLC) and also, for example, to receive signals from the same.

To integrate the control device into conventional network segments, it is realized preferably with at least one standard network interface—where applicable in addition to an existing industry compatible data communications interface. This ensures simple and direct integration, independent of the design of the external network infrastructure, of the control device into existing standard network segments—for example the office network of a company ("Office Ethernet") or the Internet. Devices already connected (fieldbus) or networked (industrial Ethernet) on the industrial control or production level (also designated as "field level") can certainly also be connected directly to standard network segments or can be integrated in the same either via special infrastructure components (e.g. gateways) or with adequate compatibility depending on the data transmission technology used. In addition, technical solutions also exist in reverse for integrating standard Ethernet components, such as, for example, a conventional PC into fieldbus or industrial Ethernet environments. Even in the case of theoretically possible direct connectability, however, a mixed operation of standard components ("standard Ethernet") and devices at field level (industrial Ethernet) inside a common network segment is, as a rule, avoided in this connection in order to be able to ensure sufficient industrial capability of the connected components, for example with regard to necessary real-time capability and failure safety, in an unrestricted manner at field level. By the control device being realized with at least one standard network interface, direct integration of the control device into conventional network segments is ensured at all times independently of the existing external network infrastructure and the available infrastructure components. The control device is, for example, parametrizable via the standard network interface (input or modification in the default parameter), in addition sensor data, calculation data or other process data acquired and stored (by way of buffering) by the control device are able to be called up. If the control device is also realized simultaneously with an industry-compatible data communications interface, separation of standard Ethernet and field level is already effected at the level of the control device. The standard network interface can be designed in a wired (Ethernet) or wireless (WLAN) manner. Where designed as a wired network interface, the control device is also connectable via the same indirectly to an external access point for wireless data communication, for instance a wireless access point.

Easier parameterization of the device or easier call-up of data acquired and stored in the device is achieved by the control device being set up in a programming manner with a server service and a user interface for the input of parameterization data and/or for the display of or for the output of sensor data and/or calculation data acquired via an existing data communications interface or a standard network interface. This is, for example, a web server service to input parameterization data remotely and/or to display remotely or call up remotely data stored in the device. As a result, it is also possible for the operator to input new parameterization data in a simple manner ("on the fly"). In addition, this enables the operator to monitor the process on the fly by calling up sensor and calculation data.

In the above realization, expanded process monitoring is made possible by the server service being realized with at least one evaluation and/or analysis unit for the generation of evaluation and/or analysis results and for the display or the output of the evaluation and/or analysis results via an existing data communications interface or a standard network interface. As a result, measurement curves are generated by the server service, for example on the fly and are provided for display or for call up by the operator. In addition, warning or alarm signals can be output, in this connection, by the control device to the operator or to a higher-level plant control system by threshold values for acquirable process parameters (attainment of a maximum or minimum pressure value at the valve inlet or valve outlet, failure of the calculation of a control value as a result of predefined values for pressure, container volume and time period) being predefined for the control device by way of the parameterization.

A particularly advantageous, compact design, which enables particularly flexible integration into installations for blow molding, is achieved by all components of the device being realized as one common structural unit. As a result of the compact and integrated realization, it is also possible to retrofit existing plants in a simple manner by exchanging the existing valve unit for the control device, as a result of which older installations are able to be retrofitted with a correspondingly performant control platform and current output and input interfaces.

A further core of the disclosure is formed by a method for controlling the throughflow of the blow-molding fluid during the blow molding of containers produced from preforms, including a proportional valve having a modifiable throughflow cross section, an actuator for actuating the proportional valve, a means for detecting the position of the actuator and sensor means for detecting the valve inlet pressure and valve outlet pressure, where a time point for the attainment of the yield point for the preform, a container volume and a time period for the attainment of the container volume are predefinable and by means of a digital control, a calculation of control values for the actuation of the actuator for the attainment of the predefined container volume within the predefined time period is effected cyclically in a manner automated to the run-time during the pre-blow molding phase from the attainment of the yield point and the actuator is actuated corresponding to the calculated control values, wherein in each calculation cycle, the calculation of the respectively next control value is effected with consideration to the container volume attained up to the respective calculation cycle and calculated by way of the previous actuator positions and the previous pressure course.

In a design of the method which is able to be realized in a simple manner in practice, the calculation of the control values is effected in each calculation cycle with the functional aim of growth in the container that is as uniform as possible up to the attainment of the predefined container volume within the predefined time period. The technical control model of the digital control includes, to this end, a corresponding qualitative quality default, according to which the calculation of the respectively next control value is effected in each calculation cycle with the aim of growth in the container that is as uniform as possible up to the attainment of the predefined container volume within the predefined time period.

Greater manual freedom of design to influence the growth in the container is created by, in addition, at least one container interim volume and in each case one interim time period for the attainment of the container interim volume are predefinable, wherein the calculation of the control values in each calculation cycle is effected with consideration to all predefined container interim volumes and interim time periods. The operator is thus able to influence the growth in the container which is controlled per real-time calculation during the duration of the control process and to model it as a result of predefining one or multiple interim volumes.

Consideration of the container interim volumes and interim time periods additionally predefined by the operator can be taken into consideration in the technical control model of the digital control, for example by means of an interpolation function where the chronologically predefined interim volumes are based as support points for the equally chronologically predefined calculation of the container final volume to be attained. In this connection, in principle, the specification of an arbitrary number of container interim volumes and interim time periods is able to be considered, the maximum number of which is delimited simply by the technical triggering of the sensor means involved, the latency of the actuation of the actuator and the speed of performance of the control device. The more container interim volumes and interim time periods are predefined, the greater the modeling degree of the design of the growth of the container.

In a simple realization, the point in time which corresponds to the attainment of the yield point of the preform is predefinable as a specific pressure value. As a result, the time of the attainment of the yield point is acquirable in the process as a result of evaluating the valve outlet pressure and is evaluatable as a starting point for the calculation of the control values.

In a self-optimizing realization of the method, the time which corresponds to the attainment of the yield point of the preform is predefinable as target definition as a certain point in time or as a time interval from the start of the pre-blow molding phase or of the introduction of the blow-molding fluid. The attaining of the yield point is determined by the digital control by means of the evaluation of the valve outlet pressure as acquiring a pressure peak and a control sequence for the actuation of the actuator is calculated for the attainment of the yield point up to the predefined point in time or expiry of the predefined time interval. In this case, the method already includes the control of the throughflow of the blow-molding fluid prior to the attainment of the yield point by way of a corresponding control sequence (actuator position) for said interval of the pre-blow molding phase. The calculation of the control sequence to be applied up to the attainment of the yield point requires at least one first device pass (a first pass of the blow-molding process at a constant valve lift) in order to determine the specific yield point of the material to be processed in each case as a result of the evaluation of the valve outlet pressure at a selectively constant valve lift (position of the actuator) as acquiring a pressure peak. The control method in said realization includes a further self-optimizing characteristic in operation (after the initial setup), as deviations in the physical characteristics of the processed preforms—for example their pre-tempering or quality—which result in delaying the yield point in time, are recognized and corrected.

BRIEF DESCRIPTION OF THE DRAWINGS

Further advantages of the disclosure are shown in more detail below together with the description of preferred exemplary embodiments of the disclosure by way of the figures, in which.

DETAILED DESCRIPTION

Figure 1:
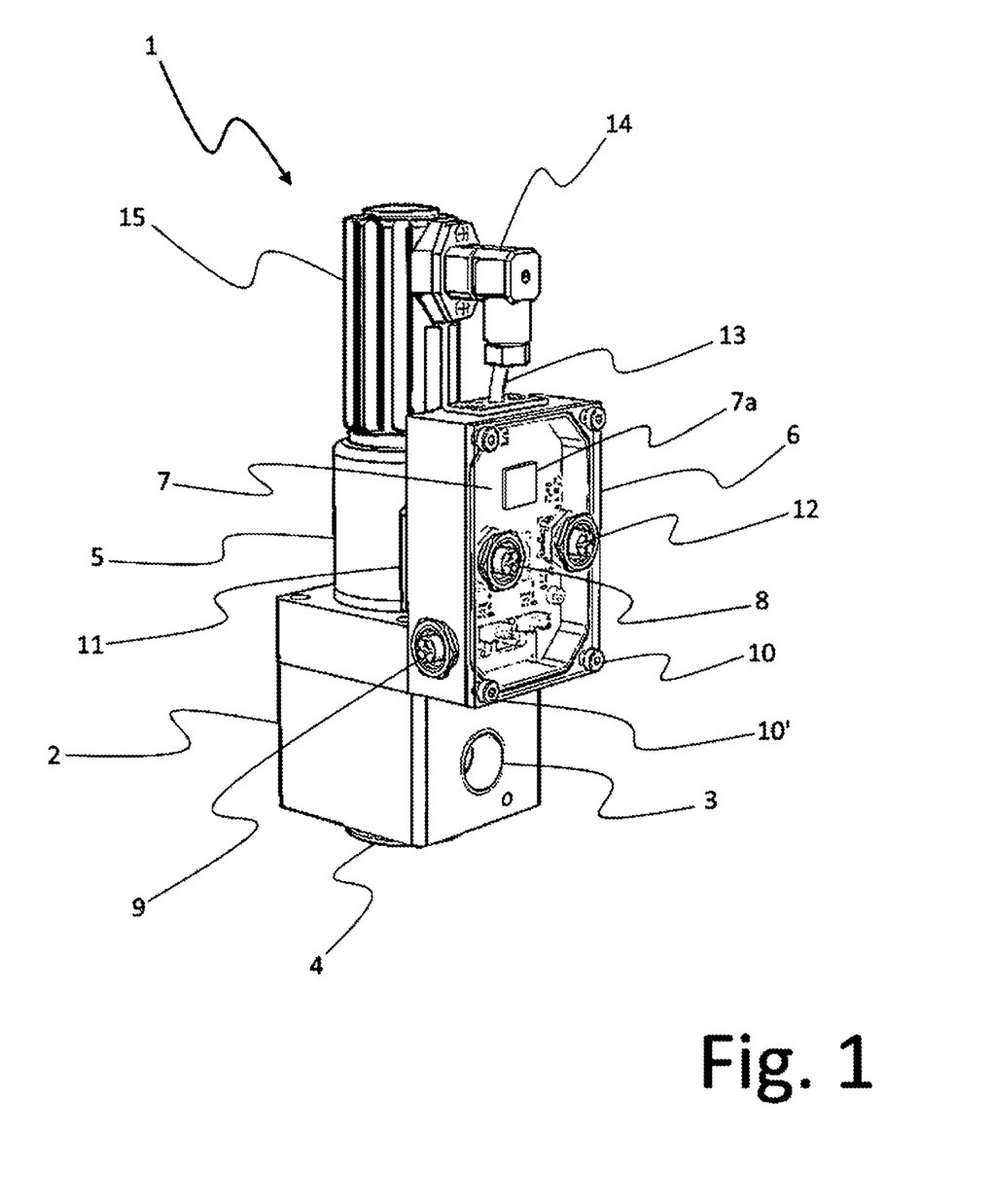
FIG. 1 shows a perspective representation of a device for controlling the throughflow of blow-molding air during the blow molding of containers produced from preforms.

FIG. 1 shows the control device 1 with the proportional valve 2, which is a 2/2-way valve and comprises a compressed air inlet 3 and a compressed air outlet 4. The actuation of the proportional valve 2 is effected by means of the electrically actuatable proportional magnet 5 which serves as actuator for the actuation of the proportional valve 2. The proportional magnet 5 is controlled by means of the digital control device 6 which consists of a programmable single-board computer (SBC) which is mounted in a housing and where all the electronic components (CPU, memory, input and output interfaces, D/A converter, DMA controller, etc.) necessary for operation are combined on one single printed circuit board 7. The printed circuit board 7 with various electronic component parts and the CPU 7a can be seen in part in FIG. 1 through the transparently shown front cover of the housing of the control device 6. The printed circuit board 7 is realized for connection to a fieldbus or industrial Ethernet system by way of a data communications interface 8 which extends out of the housing of the control device 6 as an M12 plug-in connector socket. The data communications interface 8 is designed, if necessary, for example, as a fieldbus interface (for example compatible with Profibus, DeviceNet/ControlNet or CANopen) or as an industrial Ethernet interface (for example compatible with Profinet, EtherNet/IP, Ethernet Powerlink or EtherCat). It can be designed to be compatible with several protocol standards at the same time. Via the data communications interface 8, the control device 6 is integratable into fieldbus or industrial Ethernet systems, installation devices and/or a programmable logic plant control system (PLC) which exist at the location. The control device 6 is additionally also connectable via the data communications interface 8 to an external access point for wireless data communication, for instance an industrial wireless access point. In addition, the printed circuit board 7 is realized with a network interface 9 which extends out of the housing of the control device 6 also as an M12 plug-in connector socket and is a standard Ethernet interface. The control device 6 is connectable, for example, to an office network or the Internet via the network interface 9. The control device 6 is additionally also connectable to an external access point for wireless data communication, for instance a wireless access point, via the network interface 9. The housing of the control device 6 is screw-connected to the housing of the proportional valve 2 with the screws 10 and 10'. The printed circuit board 7 of the control device 6 is connected internally via signal lines 24, 24' (cannot be seen in FIG. 1 due to the perspective) to sensor means 23, 23' (cannot be seen in FIG. 1 either also due to the representation), which are integrated into the proportional valve 2, for acquiring the valve inlet and valve outlet pressure and which extend out of the housing of the proportional valve 2 via the connection base 11. The control device 6 receives its power supply via the power connection 12 which extends out of the housing of the control device 6 also as an M12 plug-in connector socket. In addition, the control device 6 is connected to the proportional magnet 5 and the Hall sensor 15 via the combined and correspondingly multicore control/signal line 13 and the control/signal connection 14. The proportional magnet 5 is controllable electrically per current via the control/signal connection 14. The control/signal connection 14 at the same time includes a signal connection, via which the control device 6 receives signals from the Hall sensor 15 which is fitted onto the proportional magnet 5. All components of the control device 1 are realized as a common structural unit which is compact in design. To increase the compactness further, the control device 6 can be integrated into the housing of the proportional valve 2 in a modified design or all components of the control device 1 shown in FIG. 1 can be realized in a common housing. The compact design enables simple integration into blow molding stations of blow molding installations. As, in this connection, each blow molding station is equipped with its own control device according to the disclosure, individual blow molding stations inside the same blow molding installation can be equipped differently and container forms that differ from one another can be produced and/or different material mixtures can be processed in said blow molding stations. As a result of the compact and integrated realization, it is possible in a simple manner to retrofit existing blow molding installations by exchanging the existing valve unit for control devices that are designed as the control device 1, as a result of which older installations are able to be retrofitted with a correspondingly performant control platform and current output and input interfaces. In place of arranging the pressure sensors 23, 23' directly inside the proportional valve 2, it is also possible to acquire the valve inlet and valve outlet pressure in a modified design as a result of the connection to external sensors which are already present inside the further blow molding installation and are arranged, for instance, inside a compressed air supply line to the valve inlet 3 and a compressed air connection line to the blow mold after the valve outlet 4.

Figure 2:
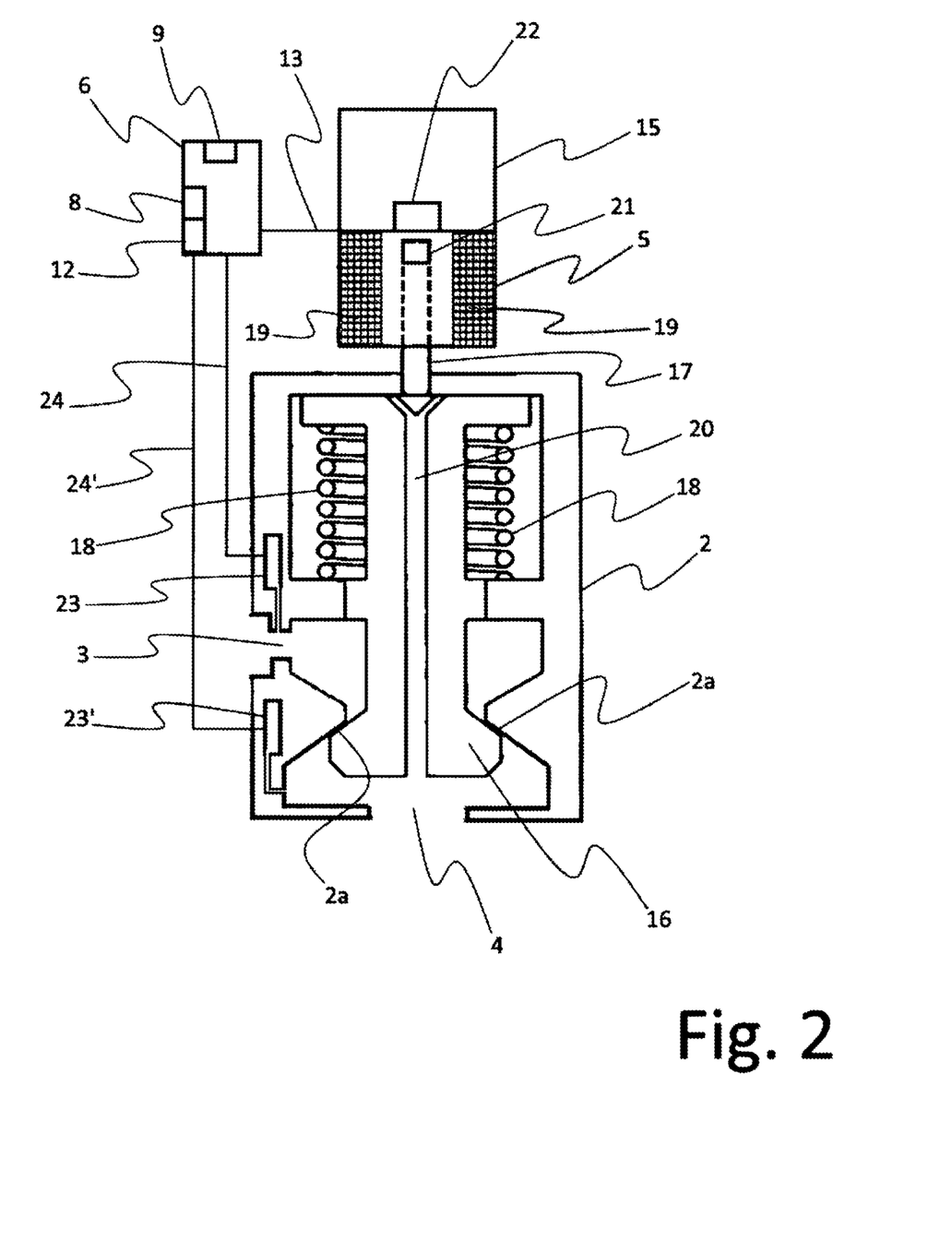
FIG. 2 shows a schematic representation of components of the control device according to FIG. 1.

FIG. 2 shows a simple schematic representation of components of the control device 1. A valve tappet 16, which ends in a cone-shaped manner, is arranged in the proportional valve 2 so as to be linearly movable. The valve tappet 16 is movable downward in opposition to the force of the spring 18 by the pin-shaped armature 17 which serves as actuator, the pressure medium inlet 3 being connected to the pressure medium outlet 4. The throughflow cross section, which is produced in relation to the boundary surface 2a of the valve body of the proportional valve 2 at the cone-shaped end of the valve tappet 16 in the open position, is continually modifiable and dependent on the linear position of the armature 17. Said armature is also mounted so as to be linearly movable inside a coil winding 19, which surrounds it, in the housing of the proportional magnet 5. The linear position (status) of the armature 17 inside the coil winding 19 is dependent on the current, which is controlled by the control device 6 via the combined control/signal line 13 and is applied in each case to the coil winding 19. The armature 17 is continually movable downward as a result of increasing the current, pressing the valve tappet 16 downward in opposition to the force of the spring 18. In the open position, the pressure in the valve tappet 16 is equalized as a result of the central compensation channel 20. The Hall sensor 15, by means of which the respective position of the armature 17 is acquirable, is fitted onto the proportional magnet 5. For this purpose, the armature 17 is realized at its upper end with the permanent magnet means 21 and the Hall sensor 15 with the sensor means 22 which detects the relative distance between the permanent magnet means 21 and itself in a contactless manner. A signal representing the respective position of the armature 17 is transmitted by the Hall sensor 15 via the combined control/signal line 13 to the control device 6. Pressure sensors 23 and 23' are additionally arranged in the proportional valve 2 as sensor means for acquiring the valve inlet pressure (by the pressure sensor 23) and the valve outlet pressure (pressure sensor 23') and are connected to the control device 6 via the signal lines 24 and 24'.

Figure 3:
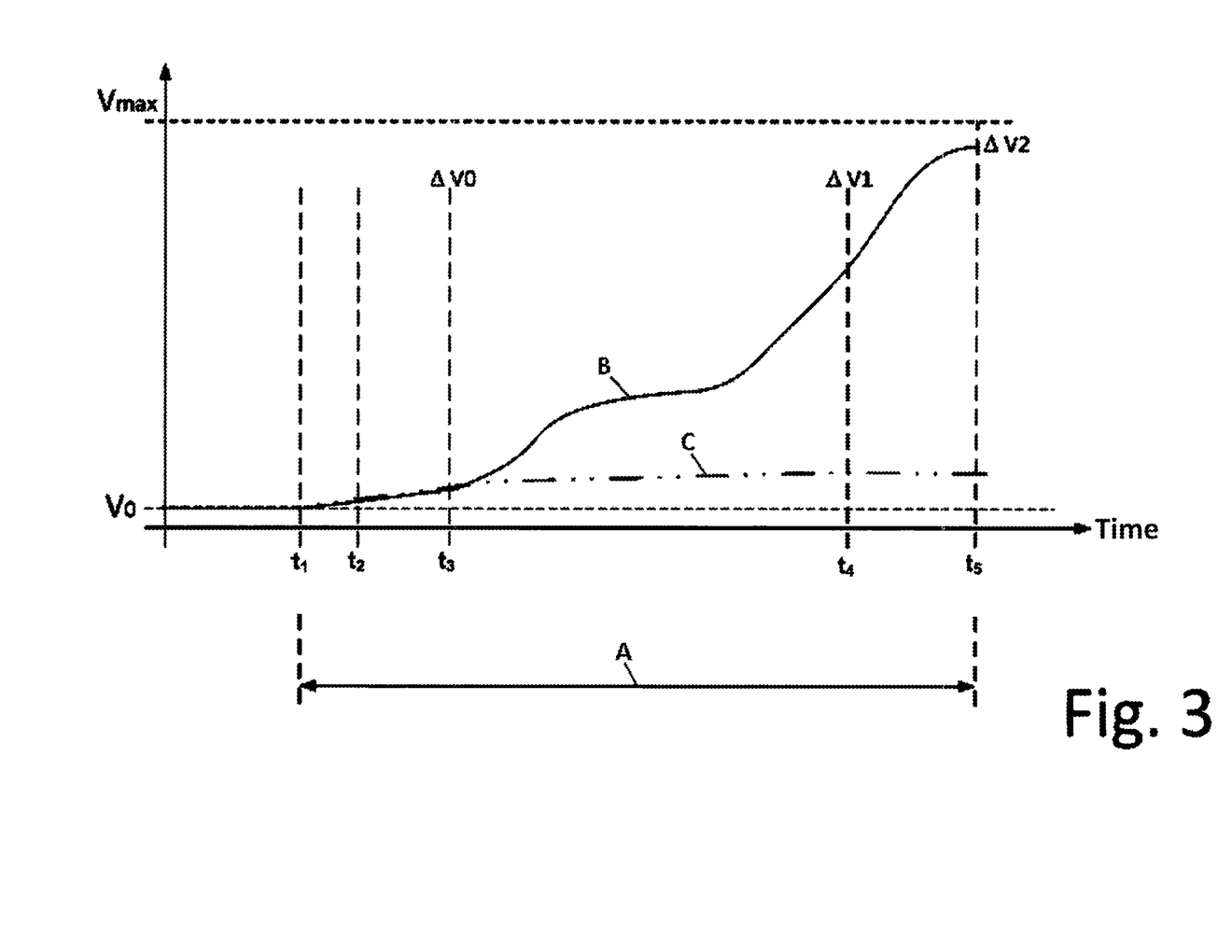
FIG. 3 shows a diagram for illustrating the growth in volume brought about in the preform during the chronological sequence of a stretch blow molding process.

FIG. 3 shows the container expansion of a preform during an exemplary chronological sequence of a stretch blow molding process (production of a container) as a volume/time diagram, the abscissa axis representing the course of time and the ordinate axis representing the growth in volume. The stretching operation, with the horizontal bar extended linearly in the blow molding mold, starts initially at time $t_1$ (at which the preform has the initial volume Vol. The preform is stretched in the longitudinal direction. At time $t_2$ (at which the preform simply has a small growth in volume compared to the initial volume $V_0$, brought about solely by longitudinal stretching) the introduction of the blow-molding air begins via the proportional valve 2. This can be triggered, for example, by a corresponding control signal from a higher-level plant control system (PLC) via the data communications interface 8 of the control device 1. At time t the yield point of the preform is attained. At said moment, the volume of the container is $\Delta V0$ which represents the initial volume for the control process during the pre-blow molding phase. The growth in the container, brought about up to now as a result of the introduction of the blow-molding air since the time $t_2$, is calculatable by way of the previous pressure course acquired by way of the pressure sensors 23 and 23', the actuator positions of the proportional magnet 5 acquired with the Hall sensor 15 (and consequently the course of the variable of the opening cross section of the proportional valve 2). At time t4, the end of the stretching operation is attained and the horizontal bar is fully extended. At this point in time, the container has the already strongly increased volume $\Delta V1$ as a result of the expansion of the container once the yield point has been exceeded as a result of further introducing the blow-molding air. The growth in the container brought about up to now as a result of the introduction of the blow-molding air is calculatable by way of the previous data acquired by the sensors. At time $t_5$, the end of the pre-blow molding phase of the stretch blow molding process is attained, at which the expansion of the container balloon has attained the final volume $\Delta V2$ which is defined for the pre-blow molding phase. Once time $t_5$ has been attained, the pre-blow molding phase ends and the final blow molding phase begins (also designated as the main blow molding phase), in which the container, under a sharply increased pressure level, is brought into its desired final form and the definitive final volume $V_{max}$ is brought about. The time period A consequently characterizes the extent of the pre-blow molding phase during the stretch blow molding process which, in practice, is approximately 200 ms. The graph B symbolizes the change in the volume of the preform and consequently at the same time the growth of the container balloon up to the time $t_5$. The curve C symbolizes the growth in the volume brought about purely by the longitudinal stretching of the preform with the extending of the horizontal bar. The diagram in FIG. 3 consequently shows that the essential growth in the volume of the container balloon is brought about as a result of the introduction of the blow-molding air in the pre-blow molding phase. The slight changes in the volume brought about both by only the extending of the horizontal bar according to curve C and those in the final blow molding phase (corresponding to the difference in volume $V_{max}-\Delta V2$) can consequently be ignored in practice for the control procedure. As an alternative to this, said changes in the volume can be taken into consideration in the control model by corresponding absolute or percentage blanket variables or, insofar as they are easily assessable and determinable, can be predefinable as additional parameters.

Figure 4:
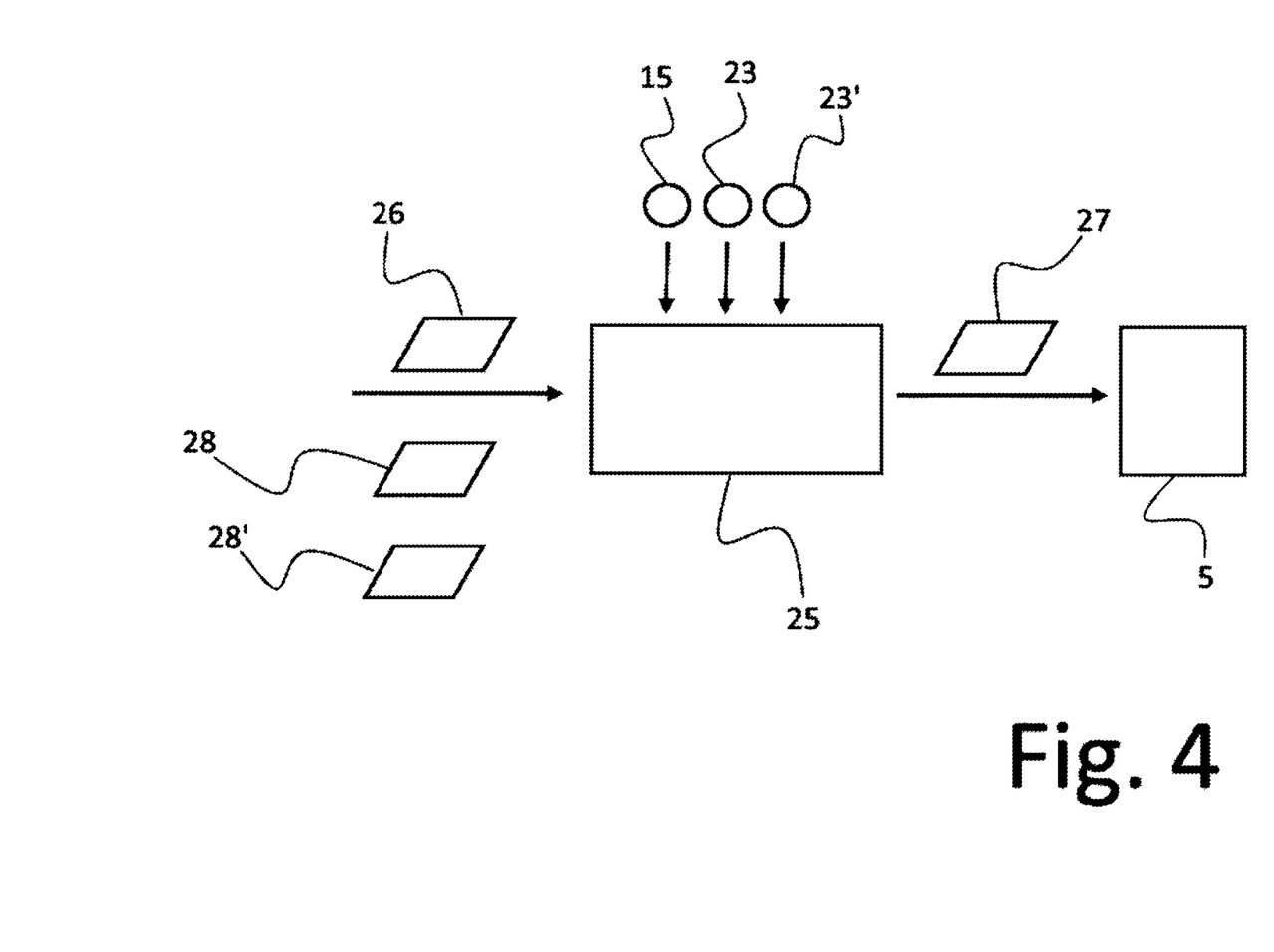
FIG. 4 shows a schematic block diagram of a digital control with input and output variables.

FIG. 4 shows a simplified schematic block diagram of embodiments of the digital control 25 according to the disclosure with input and output variables. The specification of the desired container final volume $V_{max}$ at time $t_{max}$, which corresponds to the end of the control operation, serves as a global default variable 26 for the control 25. In a simple design of the control, this corresponds to the default of the volume $V_{max}$ for the time $t_5$ (the end of the control time period for the pre-blow molding phase) corresponding to the representation according to FIG. 3. In alternative designs, the volume difference $V_{max}-\Delta V2$ brought about in the final blow molding phase and/or the change in volume brought about only by the extending of the horizontal bar according to curve C in FIG. 3 can be taken into consideration additionally in the control model for the control up to time $t_5$ by deducting corresponding absolute or percentage blanket variables. Insofar as can be estimated or determined through preliminary tests, the volume $\Delta V2$—where applicable additionally minus the change in volume brought about only by the extending of the horizontal bar—can also be predefined directly as default variable 26 at time $t_5$ corresponding to the representation according to FIG. 3. Insofar as the proportional valve is also utilized for the introduction of the blow-molding air in the final blow molding phase, the change in volume from $\Delta V2$ to $V_{max}$ brought about in the final blow molding phase can additionally be determined in a device pass by way of the sensor values and, automated in the control model, can be taken into consideration for the volume $\Delta V2$ to be attained up to the defined time $t_5$. By way of the default variable 26, in an automated cyclical manner the control 25 calculates the manipulated variable 27 as control value $x_{CMD_k}$ which is, as the result of each individual calculation cycle, in each case a discrete control value (i.e. a certain current) for actuating the proportional magnet 5 at the next control time $t_k$, wherein $k=0..n$ is valid. When calculating the control value $x_{CMD_k}$ for the control time $t_k$, according to the technical control model of the control 25, the container volume $V_{k-1}$ attained already in each case up to the current calculation cycle is taken into consideration, which container volume is calculated by way of the previous actuator positions $\tilde{x}_{k-1}$ acquired with the Hall sensor 15 up to time k−1 and the sequences of the valve inlet pressure $\tilde{P}1_{k-1}$, and of the valve outlet pressure $\tilde{P}2_{k-1}$ acquired with the pressure sensors 23 and 23'. The values acquired by the Hall sensor 15 and the pressure sensors 23 and 23' are written, for this purpose, for example, continuously in DMA registers inside the memory of the control device 6 and are buffered continuously by the control device 6 at least during the run-time during the time period A.

To calculate the manipulated variable 27 as control value $x_{CMD_k}$, the digital control 25 is set up in a programming manner with instructions with which is imaged a correspondingly suitable, technical control model, which is derived from the general laws of fluid mechanics with the known relationships between the variables volume flow and mass flow $\dot{m}$.

$$Q = \dot{V} = \frac{dV}{dt}$$

$$q_m = \dot{m} = \frac{dm}{dt}$$

for fluids calculatable by $$\dot{m} = \varrho \cdot \dot{V} = \varrho \cdot c \cdot A.$$

with $\varrho$ Density of the medium
c Mean flow speead
  A Cross sectional area
  $\dot{V}$ Volume flow.

The pressure force Fp generated by the valve outlet pressure $P_2$ inside the preform with the inner wall surface $A_o$ acts with $$F_p = p_2 \cdot A_o$$

on the container inside surface. The change in volume $\dot{V}$ resulting from this, for example when using a blow molding gas on the basis of the general gas law of ideal gases, is calculated by $$\dot{V} = \dot{m} \cdot \frac{R \cdot \vartheta}{p_{2_A}} - V \cdot \frac{\dot{p}_2}{p_{2_A}}$$

wherein R is the general gas constant and $\vartheta$ is the gas temperature deemed to be constant in time. On the basis of the technical control model derived from the known principles stated above, the calculation of the respectively next control value 27 for the actuation of the actuator to attain the predefined container volume within the time period predefined for this purpose is effected in each case as a control value sequence which is calculated successively in an automated manner, in each calculation cycle the container volume already attained previously being taken into consideration. To this end, the respectively next control value $x_{CMD_k}$ is recalculated to the next control time point $t_k$ in each calculation cycle proceeding from the predefined container final volume $V_{max}$ at time $t_{max}$, the container volume $V_{k-1}$ already attained up to the respective calculation cycle and calculated by way of the acquired sensor data being taken into consideration. The control value $x_{CMD_k}$ calculated for the respective control time point $t_k$ consequently corresponds to the throughflow cross section of the proportional valve 2 necessary in each case to attain the residual volume $V_{max}$-$V_{k-1}$ remaining at said time in the remaining time period $t_{max}$-$t_k$ under the given pressure conditions. In this connection, necessary boundary parameters, such as the specific density of the blow-molding fluid used in each case, the isentropic exponent of a blow molding gas used, the valve-specific, pressure-dependent flow speed characteristic value of the proportional valve used and the specific cross sectional area of the proportional valve used which is modifiable in dependence on the position of the actuator, are taken into consideration. The slight changes in volume brought about only by the extending of the horizontal bar and in the final blow molding phase, as shown in conjunction with FIG. 3, are able to be ignored for the control in practice. In addition, variables and parameters which are only modifiable in practice to a small extent, such as, for example, the temperature of the blow-molding fluid, can be taken into consideration simplified as constants, since possible considerable qualitative changes in such boundary parameters are taken into consideration indirectly as a result of the self-correction which is continuous and inherent to the method according to the disclosure (as a result of the consideration of the container volume attained in each calculation cycle).

In a simple realization of the control 25, only the default variable 26, corresponding to the desired container final volume $V_{max}$ at time $t_{max}$ is predefined. Recalculation of the manipulated variable 27 as control value $x_{CMD_k}$ at control time $t_k$ is effected, in this connection, in each case, by way of a corresponding qualitative quality default in the technical model, with which the calculation of the control value $x_{CMD_k}$ in each calculation cycle is calculated with the aim of a growth in the container that is as uniform as possible overall up to the attainment of the predefined container final volume $V_{max}$ at time $t_{max}$.

The default variables 28 and 28', which correspond to the attainment of the container interim volume $\Delta V0$ at time $t_3$ (default variable 28) and the attainment of the container interim volume $\Delta V1$ at time $t_4$ (default variable 28') according to the diagram in FIG. 3, are additionally predefined in an alternative realization of the control 25. The recalculation of the manipulated variable 27 as control value $x_{CDM_k}$ at time $t_k$ is effected, in this connection, in each case, by an interpolation where the interim volumes 28 and 28', predefined in time, as support points form the basis for the calculation of the container final volume $V_{max}$ at time $t_{max}$.

LIST OF REFERENCES

1 Control device
2 Proportional valve
2a Boundary surface
3 Compressed air inlet
4 Compressed air outlet
5 Proportional magnet
7 Control device
7 Printed circuit board
7a CPU
8 Data communications interface
9 Network interface
10,10' Screw
11 Connection base
12 Power connection
13 Control/signal line
14 Control/signal connection
16 Hall sensor
16 Valve tappet
17 Armature
18 Spring
19 Coil winding
20 Compensation channel
21 Permanent magnet means
22 Sensor means
23,23' Pressure sensor
24,24' Signal line
25 Control
26,28,28' Default variable

The invention claimed is:

1. A device for controlling the throughflow of blow-molding fluid during the blow molding of containers produced from preforms, comprising:
a proportional valve having a modifiable throughflow cross section,
an actuator for actuating the proportional valve,
a means for detecting the position of the actuator,
sensor means for detecting the valve inlet pressure and valve outlet pressure and a digital control device,
wherein the control device is set up in a programming manner for the purpose of calculating cyclically, in a manner automated to the run-time, control values for actuating the actuator for the attainment of a predefined container volume within a predefined time period during the pre-blow molding phase from the attainment of a predefinable time point, which corresponds to the attainment of the yield point of the preform,
wherein in each calculation cycle the calculation of the respectively next control value is effected with consideration to a current container volume attained up to the respective calculation cycle, the current container volume being calculated by way of the previous actuator positions and the previous pressure course, and
wherein the control device calculates the control values without reference to a setpoint value profile or setpoint value curve that specifies a control or regulating parameter over time for actuation of the proportional valve.

2. The device as claimed in claim 1, wherein the attainment of the yield point is predefinable as a pressure value.

3. The device as claimed in claim 1, wherein the attainment of the yield point is predefinable as a time point or as a time interval from the start of the pre-blow molding phase or the introduction of the blow-molding fluid and the control device is set up in a programming manner for the purpose of establishing the attainment of the yield point as a result of the evaluation of the valve outlet pressure as acquiring a pressure peak and of calculating a control sequence for actuating the actuator for attaining the yield point up to the predefined time point or expiry of the predefined time interval.

4. The device as claimed in claim 1, wherein the control device is realized with at least one data communications interface which is compatible with at least one industrial protocol standard.

5. The device as claimed in claim 4, wherein the control device is set up in a programming manner with a server service and a user interface for the input of parameterization data and/or for the display of or for the output of sensor data and/or calculation data acquired via the data communications interface or the standard network interface.

6. The device as claimed in claim 5, wherein the server service is realized with at least one evaluation and/or analysis unit for the generation of evaluation and/or analysis results and for the display of or the output of the evaluation and/or analysis results via the data communications interface or the standard network interface.

7. The device as claimed in claim 1, wherein the control device is realized with at least one standard network interface.

8. The device as claimed in claim 1, wherein all components are realized as a pre-assembled unit.

9. A method for controlling the throughflow of the blow-molding fluid during the blow molding of containers produced from preforms, including a proportional valve having a modifiable throughflow cross section, an actuator for actuating the proportional valve, a means for detecting the position of the actuator and sensor means for detecting the valve inlet pressure and valve outlet pressure, comprising:
 predefining a time point for the attainment of the yield point for the preform, a container volume and a time period for the attainment of the container volume;
 calculating by means of a digital control, control values for the actuation of the actuator for the attainment of the predefined container volume within the predefined time period, the calculating being performed cyclically in a manner automated to the run-time during the pre-blow molding phase from the attainment of the yield point;
 wherein the actuator is actuated corresponding to the calculated control values,
 wherein in each calculation cycle, the calculation of the respectively next control value is effected with consideration to a current container volume attained up to the respective calculation cycle, the current container volume being calculated by way of the previous actuator positions and the previous pressure course, and
 wherein the control device calculates the control values without reference to a setpoint value profile or setpoint value curve that specifies a control or regulating parameter over time for actuation of the proportional valve.

10. The method as claimed in claim 9, wherein the calculation of the control values is effected in each calculation cycle with the functional aim of growth in the container that is as uniform as possible up to the attainment of the predefined container volume within the predefined time period.

11. The method as claimed in claim 9, wherein in addition, at least one container interim volume and in each case one interim time period for the attainment of the container interim volume are predefinable, wherein the calculation of the control values in each calculation cycle is effected with consideration to all predefined container interim volumes and interim time periods.

12. The method as claimed in claim 9, wherein the attainment of the yield point is predefinable as a pressure value.

13. The method as claimed in claim 9, wherein the attainment of the yield point is predefinable as a time point or as a time interval from the start of the pre-blow molding phase or the introduction of the blow-molding fluid and by means of the digital control determining of the attainment of the yield point is effected as an evaluation of the valve output pressure as a result of the determining of a pressure peak and a control sequence for the actuation of the actuator for the attainment of the yield point is calculated up to the predefined time point or expiry of the predefined time interval.

* * * * *